Patented May 11, 1926.

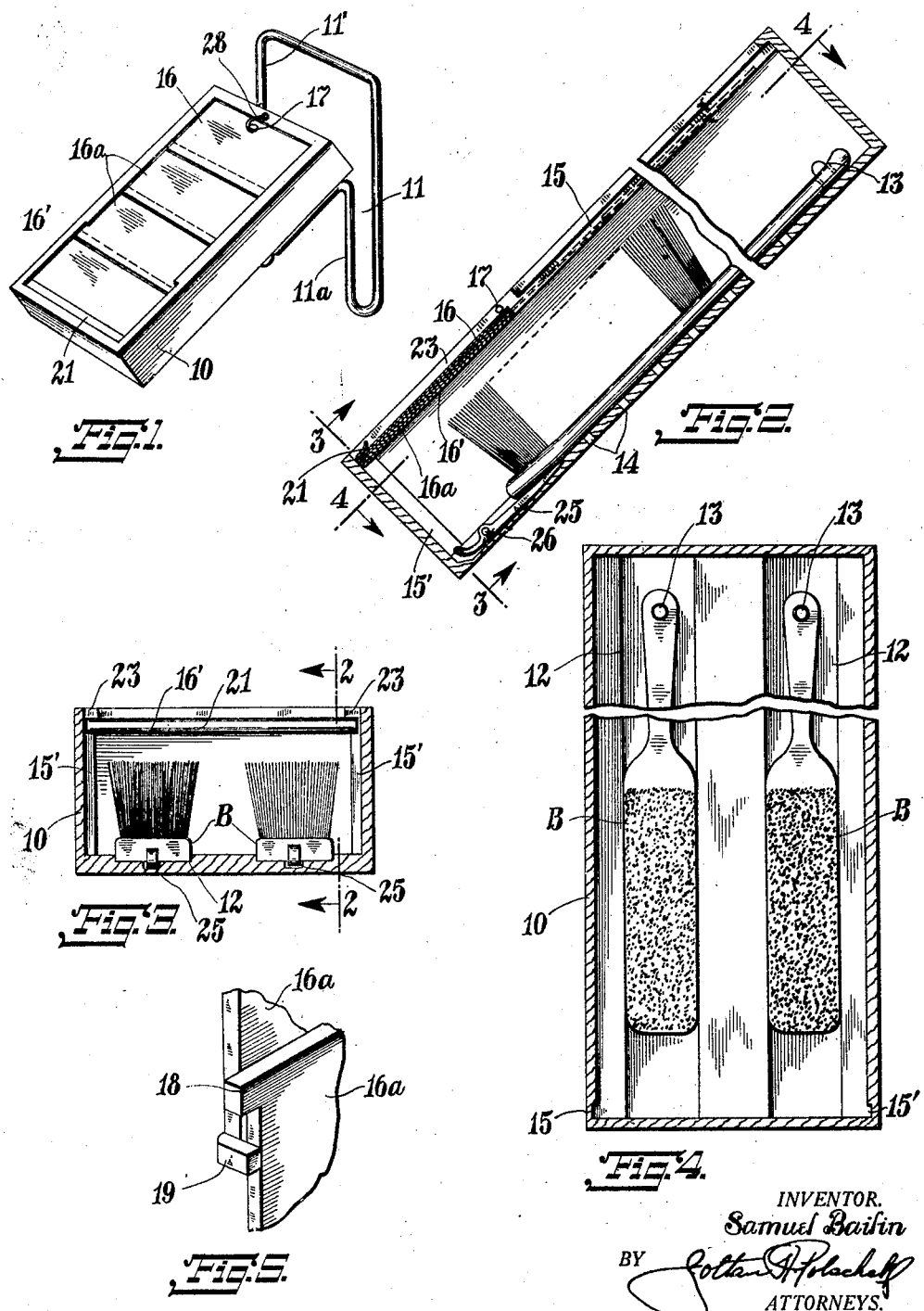

1,584,206

UNITED STATES PATENT OFFICE.

SAMUEL BAILIN, OF BROOKLYN, NEW YORK.

SANITARY TOOTHBRUSH RECEPTACLE.

Application filed February 14, 1925. Serial No. 9,354.

This invention relates to a holder or receptacle for toothbrushes, that may be conveniently mounted on the wall of a bathroom, and in which the brushes are held, and shielded from dust or the like, the invention having for an object the provision of a simple and novel device of this sort.

For further comprehension of the invention, and of the objects and advantages thereof, reference will be had to the following description and accompanying drawing, and to the appended claims in which the various novel features of the invention are more particularly set forth.

Fig. 1 of the drawing is a perspective view showing my improved toothbrush holder.

Fig. 2 is a longitudinal vertical sectional view thereof, this view being taken on the line 2—2 of Fig. 3.

Fig. 3 is a transverse sectional view taken on the line 3—3 of Fig. 2.

Fig. 4 is a longitudinal sectional view taken on the line 4—4 of Fig. 2.

Fig. 5 is a detail perspective view illustrating the manner of linking the cover sections to one another.

Referring now to the drawing, my improved holder comprises an elongated rectangular box 10 which is fixed at one end to the ends of a bent rod 11 doubled upon itself between its ends to present two parallel reaches 11′ which are adapted to lie upon the wall of the bathroom and be secured thereto by staples or the like, the ends of the said rod being bent upwardly, and then downwardly at an oblique angle to the wall elements 11′ and having the box fixed thereon, the box assuming the oblique or inclined position here shown. The box may be arranged to hold a desired number of toothbrushes, such as indicated at B, being formed in the bottom thereof with longitudinal grooves 12 in which the backs of the brushes are positioned. Hooks such as 13 may be provided in the box to engage apertures in the handles of the brushes to hold them in place, while ventilation openings 14 are formed in the bottom walls of the grooves 12.

The top or front of the box is formed from a sectional door made up of a number of leaves that normally overlap one another slightly, as indicated in dotted lines in Fig. 2 and which are accommodated at their edges in longitudinal guide grooves 15 in the side walls of the box. As here shown the cover consists of four leaves or sections comprising a top leaf 16, a bottom leaf 16′ and a pair of intermediate leaves 16ᵃ. The upper leaf 16 is provided with a knob or button 17, while the different leaves are linked to one another in a manner to cause the leaves to be moved in sequence when the cover is being closed. To this end each leaf but the top one is formed with a pair of straight side projections such as 18 on its top edge, while each leaf but the bottom one is formed with a pair of angular lugs or projections 19 on the sides thereof at its lower edge, the projections 19 being engaged under the projections 18 when the cover is closed. The bottom leaf 16′ is formed with a channeled lip or projection 21 along its bottom edge which receives the bottom edges of the other leaves when the cover is open, and which is preferably arranged to resiliently clamp the said other leaves therein.

The grooves 12 in the sides of the box are extended downward into the box at the lower end of the latter as at 15′ to receive the door or cover when the latter is in collapsed position, while the outer or front walls of the grooves 15 are cut away as at 23 to permit of the collapsed door being swung outward for insertion into the box. To facilitate removal of the brushes from the box I may mount a number of levers 25 in the bottom thereof which are fulcrumed near one end as at 26 and extend longitudinally of the box. The short arms of the levers are positioned adjacent the lower end of the box and are adapted to be engaged by the door when the latter is inserted in the box, to move the said levers, the other arms of the levers engaging under the brushes and acting to swing the latter outward or forward in the box. To hold the cover in locked position a hook 28 is provided on the top end of the box and is adapted to engage the button 17.

In the use of my improved toothbrush holder the cover is opened by sliding the upper and intermediate leaves downward until their bottom edges are gripped in the channeled member 21 on the lower section or leaf. The collapsed door may be then swung as a unit and inserted inward into the box with its side edges engaged in the grooves 15′. When the cover is being closed, the top leaf 16 is pulled upward, the intermediate leaves successively moving upward into the closed positions.

Having thus described my invention, what

I claim as new and desire to protect by Letters Patent of the United States is as follows:

1. A toothbrush holder comprising a box, a cover therefor consisting of a number of slidable sections, said box having longitudinal guide grooves in the side walls thereof to receive the edges of said sections, said grooves having extensions at one end entered inward into the box to receive the side edges of the said sections when the cover is collapsed, said grooves having a portion of their front walls cut away to permit of the collapsed door being swung outward for insertion into the grooves entered inward into the box, the adjacent end one of said sections being formed with a channeled lip along one edge thereof to receive the edges of the other sections when the cover is collapsed.

2. A toothbrush holder comprising a box, a cover therefor consisting of a number of slidable interengaging sections characterized by each section but the top one being formed with a pair of straight side projections on the top edges, while each section but the bottom one being formed with a pair of projections on the sides thereof at lower edges, to engage each other when the cover is closed, said box having longitudinal guide grooves in the side walls thereof to receive the edges of said sections, said grooves having extensions at one end entered inward into the box to receive the side edges of the said sections when the cover is collapsed, the adjacent end one of said sections being formed with a channeled lip along one edge thereof to receive the edges of the other sections when the cover is collapsed.

3. A toothbrush holder comprising a box, a cover therefor consisting of a number of slidable sections, the top one of said sections being provided with a knob engageable with a hook from the top end of said box, said box having longitudinal guide grooves in the side walls thereof to receive the edges of said sections, said grooves having extensions at one end entered inward into the box to receive the side edges of the said sections when the cover is collapsed, and levers fulcrumed in the said box at the bottom thereof to be engaged by the collapsed door and move the brushes in the box outwardly when the said door is inserted into the bottom of the box.

4. In a toothbrush holder comprising a box, a cover therefor consisting of a number of slidable sections, said box having longitudinal guide grooves in the side walls thereof to receive the edges of said sections, said grooves having extensions at one end entered inward into the box to receive the side edges of the said sections when the cover is collapsed, the adjacent end of one of said sections being formed with a channeled lip along one edge thereof to receive the edges of the other sections when the cover is collapsed.

5. An toothbrush holder comprising a box, a cover therefor consisting of a number of slidable sections, said box having longitudinal guide grooves in the side walls thereof to receive the edges of said sections, said grooves having extensions at one end entered inward into the box to receive the side edges of the said sections when the cover is collapsed, and levers fulcrumed in the said box at the bottom thereof to be engaged by the collapsed door and move the brushes in the box outwardly when the said door is inserted into the bottom of the box.

In testimony whereof I have affixed my signature.

SAMUEL BAILIN.